(12) United States Patent
Zhang et al.

(10) Patent No.: US 12,196,343 B2
(45) Date of Patent: Jan. 14, 2025

(54) REAL-TIME INTELLIGENT MONITORING SYSTEM FOR LONG-DISTANCE CURVED PIPE JACKING

(71) Applicant: CHINA CONSTRUCTION INDUSTRIAL & ENERGY ENGINEERING GROUP CO.,LTD., Nanjing (CN)

(72) Inventors: Yanfang Zhang, Nanjing (CN); Anhui Wang, Nanjing (CN); Li Ni, Nanjing (CN); Jiaojiao Ni, Nanjing (CN); Tianyu Zhou, Nanjing (CN); Fan Xia, Nanjing (CN); Zhanwei Huang, Nanjing (CN); Zengxiao Gao, Nanjing (CN)

(73) Assignee: CHINA CONSTRUCTION INDUSTRIAL &ENERGY ENGINEERING GROUP CO.,LTD., Nanjing (CN)

( * ) Notice: Subject to any disclaimer, the term of this patent is extended or adjusted under 35 U.S.C. 154(b) by 353 days.

(21) Appl. No.: 17/723,538

(22) Filed: Apr. 19, 2022

(65) Prior Publication Data
US 2022/0235882 A1    Jul. 28, 2022

(30) Foreign Application Priority Data
Jun. 3, 2021   (CN) .......................... 202110621085.5

(51) Int. Cl.
*F16L 1/11*     (2006.01)
*F16L 1/032*     (2006.01)

(52) U.S. Cl.
CPC ................. *F16L 1/11* (2013.01); *F16L 1/032* (2013.01)

(58) Field of Classification Search
CPC ... F16L 1/032; F16L 1/11; F16L 1/028; E21D 9/008; E21D 9/1006
(Continued)

(56) References Cited

U.S. PATENT DOCUMENTS

2011/0278270 A1    11/2011   Braga et al.

FOREIGN PATENT DOCUMENTS

CN     111425213 A     6/1998
CN     202165088 U     3/2012
(Continued)

OTHER PUBLICATIONS

CNIPA, Notification of First Office Action for Chinese application CN202110621085.5, Dec. 17, 2021.
(Continued)

*Primary Examiner* — Sean D Andrish
(74) *Attorney, Agent, or Firm* — Hemisphere Law, PLLC; Zhigang Ma

(57) ABSTRACT

Disclosed is a real-time intelligent monitoring system for long-distance curved pipe jacking, which includes a pipe jacking mechanism and a working platform, wherein the working platform includes a control console and a main jacking hydraulic oil cylinder, the control console is arranged at one side of the main jacking hydraulic oil cylinder and is electrically connected with the main jacking hydraulic oil cylinder, the pipe jacking mechanism includes a pipe jacking machine, a curved jacking pipe and a jacking pipe, an arcing assembly is arranged inside the curved jacking pipe, a soil settlement monitoring assembly is arranged at the top of the jacking pipe, and laser induction assemblies are arranged inside the pipe jacking machine, the curved jacking pipe and the jacking pipe correspondingly.

8 Claims, 11 Drawing Sheets

(58) Field of Classification Search
USPC .............................................. 405/184, 184.4
See application file for complete search history.

(56) References Cited

FOREIGN PATENT DOCUMENTS

| | | | |
|---|---|---|---|
| CN | 202834381 U | | 3/2013 |
| CN | 109403995 A | | 3/2019 |
| CN | 111360479 A | | 7/2020 |
| CN | 111795211 | * | 10/2020 |
| CN | 111894613 A | | 11/2020 |
| CN | 112503248 A | | 3/2021 |
| JP | H10169365 A | | 6/1998 |
| JP | H10300468 A | | 11/1998 |
| JP | 2000045675 A | | 2/2000 |

OTHER PUBLICATIONS

CNIPA, Notification to grant patent right for Chinese application CN202110621085.5, Jan. 14, 2022.

* cited by examiner

REAL-TIME INTELLIGENT MONITORING SYSTEM FOR LONG-DISTANCE CURVED PIPE JACKING

FIELD

The present disclosure relates to the technical field of pipe jacking construction monitoring, in particular to a real-time intelligent monitoring system for long-distance curved pipe jacking.

BACKGROUND

As an underground pipeline construction method, pipe jacking method construction does not need to excavate a surface layer and can penetrate through rivers, roads, railways, ground buildings, underground structures, various underground pipelines and the like. According to the pipe jacking method construction, a pipe jacking machine is pushed from a starting shaft through a soil layer into an arriving shaft to be hoisted mainly by means of thrust of a main jacking hydraulic cylinder, a pipeline intermediate jacking station and the like, and meanwhile, a pipeline following closely behind the pipe jacking machine is buried between the two shafts in order to realize non-excavation laying of underground pipelines, while the pipe jacking method is rapidly developed, some defects of the pipe jacking method are gradually exposed.

1. Compared with other construction methods, the pipe jacking method serving as a construction method without grooving on the ground has the biggest advantage that a non-grooving underground excavation mode is adopted, so that the influence on surface buildings (structures) is reduced, meanwhile, disturbance can be inevitably generated on soil around a jacking pipe, thus causing a series of changes of mechanical properties of the soil around the jacking pipe, when deformation of the soil around the pipe exceeds a permissible deformation range, great damage is caused to surrounding existing underground pipelines, adjacent building (structure) foundations, surface buildings (structures) and ground traffic arteries, thus causing a series of environmental problems;

2. As the pipe diameter of a jacking pipe used in actual engineering is larger and larger, large-diameter pipe jacking construction and small-diameter pipe jacking construction have different influences on soil due to the influence of the size effect of geotechnical engineering, the large-diameter pipe jacking construction can generate larger disturbance to the surrounding soil, the jacking pipe itself is more prone to settlement, thus causing a series of accidents, endangering the personal safety of constructors, and causing great economic loss.

3. Due to the continuous increase of the jacking distance of the jacking pipe or inadequate site geological survey, the situation that the jacking direction of the jacking pipe deviates from the established direction, thus deviation rectifying is needed, and even the pipe needs to be withdrawn for jacking again easily occurs in the actual construction, thus secondary disturbance is easily caused to soil in this case, larger settlement is generated, although a pipe jacking machine adopted in current site construction is provided with a deviation rectifying system, a deviation rectifying device of the pipe jacking machine is only composed of a deviation rectifying oil cylinder and a set of guiding system, if long-distance to guiding is needed in the laser conduction process, light rays of lasers are weaker and weaker, and guiding cannot be guaranteed, and finally, the deviation rectifying step of the deviation rectifying oil cylinder is influenced, so that the pipe jacking machine deviates.

In this regard, accurate deviation rectifying should be carried out on a pipe jacking machine in the monitoring process, and meanwhile, soil settlement in the jacking pipe advancing process can be monitored, so that the construction safety is improved, and the cost in the construction process is reduced. Based on this, a real-time intelligent monitoring system for long-distance curved pipe jacking is provided to solve the above problems.

SUMMARY

The purpose of the present disclosure is to provide a real-time intelligent monitoring system for long-distance curved pipe jacking so as to solve the problems proposed in the background.

In order to solve the above technical problems, the present disclosure provides the technical solution as follows: a real-time intelligent monitoring system for long-distance curved pipe jacking includes a pipe jacking mechanism and a working platform, the working platform includes a control console and a main jacking hydraulic oil cylinder, the control console is arranged at one side of the main jacking hydraulic oil cylinder and is electrically connected with the main jacking hydraulic oil cylinder, the pipe jacking mechanism includes a pipe jacking machine, a curved jacking pipe and a jacking pipe, the pipe jacking machine, the curved jacking pipe and the jacking pipe are sequentially arranged and movably connected, the main jacking hydraulic oil cylinder corresponds to the end face of the jacking pipe, a mud discharging assembly and a deviation rectifying assembly are arranged inside the pipe jacking machine, an arcing assembly is arranged inside the curved jacking pipe, a soil settlement monitoring assembly is arranged on the top of the jacking pipe, and laser induction assemblies are arranged inside the pipe jacking machine, the curved jacking pipe and the jacking pipe.

Furthermore, one end of the curved jacking pipe is connected with the pipe jacking machine through an annular liner plate, the other end of the curved jacking pipe is connected with the jacking pipe through an annular liner plate, at least two curved jacking pipes are arranged, the two curved jacking pipes are movably connected through a plurality of safety rods, the arcing assembly includes a hydraulic cylinder, a mounting base and a telescopic rod, the hydraulic cylinder and the mounting base are arranged on the corresponding end faces of two adjacent curved jacking pipes respectively, a ball head groove is formed on one side of to the mounting base, the hydraulic cylinder is fixedly connected with one end of the telescopic rod, the other end of the telescopic rod is in a ball head shape, and the ball head-shaped end of the telescopic rod is slidably arranged on the inner wall of the ball head groove.

Furthermore, the soil settlement monitoring assembly includes a mounting pipe, a settlement pipe, a settlement ring and a protective cover, the mounting pipe penetrates through the pipe wall of the jacking pipe, the bottom end of the mounting pipe is arranged inside the jacking pipe, the protective cover is arranged at a top end of the mounting pipe, a wear-resistant layer is arranged on the outer side of the protective cover, the settlement ring is slidably arranged on the inner wall of the mounting pipe, the settlement pipe is fixedly arranged inside the settlement ring, a position sensor is arranged on the inner wall of the mounting pipe, the top end of the settlement pipe is in contact connection with the protective cover through a supporting plate, a buckling cover is horizontally arranged at the bottom end of the settlement pipe, extension parts are arranged at two ends of the buckling cover correspondingly, a magnetic clamping seat is arranged on the extension part, an electromagnet corresponding to the magnetic clamping seat in position is arranged inside the jacking pipe, the magnetic clamping seat and the electromagnet are arranged in a magnetic attraction mode, and the middle of the protective cover and the middle of the buckling cover are both elastic.

Furthermore, a plurality of lifting rods are arranged at the bottom of the settlement pipe, the lifting rods all extend out of the mounting pipe, the positions where the lifting rod penetrates through the mounting pipe are hinged, the bottom of the lifting rod is fixedly connected with the top of a spring through a fixing plate, and the spring is fixedly connected with the inner bottom of the mounting pipe.

Furthermore, the pipe jacking machine includes a mud water bin and an adjusting bin, the mud water bin is movably connected with the end face of the adjusting bin, the mud water bin is connected with the curved jacking pipe through the adjusting bin, a cutterhead is arranged at the front end of the mud water bin, a plurality of crushing cutters are arranged on the peripheral wall of the cutterhead, the cutterhead sleeves a rotating shaft, a plurality of slurry guide pipes are arranged on the outer side of the cutterhead and communicate with one end of a slurry injection pipe, a center drilling tool is arranged at one ends of the slurry guide pipes, a partition plate is arranged inside the mud water bin, a motor is arranged at one side of the partition plate, an output shaft of the motor is fixedly connected with the rotating shaft, the rotating shaft is further sleeved with a stirring rod, the side, away from the partition plate, of the motor, is provided with a mud scraping plate, the mud discharging to assembly includes a spiral conveyor, the spiral conveyor is arranged inside the adjusting bin, one end of the spiral conveyor communicates with the mud water bin through the partition plate, the other end of the spiral conveyor is provided with a mud discharging vehicle, one side of the mud discharging vehicle is provided with a mud discharging pump, the mud discharging pump is connected with the ground through a mud discharging pipe, and one side of the mud discharging pipe is connected with a lubricating pipe through a pipeline, and the slurry injection pipe, the mud discharging pipe and the lubricating pipe are all arranged inside the curved jacking pipe and the jacking pipe.

Furthermore, the deviation rectifying assembly includes a plurality of deviation rectifying oil cylinders that are arranged on the inner side of the peripheral wall of the adjusting bin at equal intervals.

Furthermore, the laser induction assembly includes a laser emitter, a guider and a laser inductor, the laser emitter is arranged at one side of the main jacking hydraulic oil cylinder, a groove is formed on the inner side wall of the jacking pipe, a mounting table is arranged inside the groove, a three-dimensional attitude adjusting instrument is arranged on the mounting table, the guider is arranged at the top of the three-dimensional attitude adjusting instrument, and the laser inductor is arranged inside the pipe jacking machine.

Furthermore, a plurality of jacking pipes are arranged, the adjacent jacking pipes are hermetically connected, and a wiring channel is formed in the bottom of each jacking pipe.

Furthermore, a positioning plate is arranged on the inner wall of the mud water bin, an acquisition unit and an analysis unit are further arranged inside the mud water bin, the acquisition unit is electrically connected with the analysis unit, the acquisition unit is used for acquiring the linear distance before and after deflection of the positioning plate and sending the acquired linear distance data to the analysis unit, and the analysis unit is used for calculating the angle before and after deflection of the positioning plate.

Furthermore, the acquisition unit is an infrared sensor, the analysis unit is a Programmable Logic Controller (PLC), the hydraulic cylinder is electrically connected with the PLC, the positioning plate includes a first-state positioning plate and a second-state positioning plate, the second-state positioning plate is in a state after the first-state positioning plate deflects around a fixed point, an infrared signal is perpendicular to the plane where the first-state positioning plate is located, the fixed point is set as a point R, the point of intersection of the infrared signal and the first-state positioning plate is set as a point A, the point of intersection of the infrared signal and the second-state positioning plate is set as a point B, the position of the infrared sensor is to set as a point C, and the deflection angle θ between the first-state positioning plate and the second-state positioning plate is calculated according to the following formula:

$$h = L - L';$$
$$\tan\theta = \frac{h}{x};$$
$$\theta = \arctan\frac{h}{x};$$

wherein x is the perpendicular distance between the infrared signal and the point R, L is the distance between A and C, L' is the distance between B and C, and h is the distance between A and B.

Compared with the prior art, the present disclosure achieves the following beneficial effects:

1. The deviation rectifying oil cylinder is used for enabling the pipe jacking machine to deviate in the jacking process, meanwhile, the arcing assembly cooperates with the deviation rectifying oil cylinder to achieve curved jacking of the whole jacking pipe, when the pipe jacking machine deviates under the action of the deviation rectifying oil cylinder, a ball head groove where the curved jacking pipe is located can wrap one end of a telescopic rod to achieve rotation, so that the pipe jacking machine can easily deviate in place, then hydraulic cylinders between the adjacent curved jacking pipes extend to further ensure that the pipe jacking machine achieves the predetermined curve jacking effect, and compared with a traditional mode that only hydraulic cylinders are used for assisting jacking, the jacking pipe is more beneficial to deflection of the pipe jacking machine under the action of the deviation rectifying oil cylinder and the ball head groove, and the problem that the jacking direction of the jacking pipe deviates from an established direction and the pipe needs to be withdrawn for jacking again due to the fact that the conventional pipe jacking machine is difficult to control or cannot reach a deflection angle of an established curve can be effectively solved.

2. The problem of soil settlement generated in the long-distance jacking process can be effectively solved by utilizing the soil settlement monitoring assembly, and after the soil outside the jacking pipe settles, the protective cover is squeezed to enable the settlement pipe to drive the settlement ring to move downwards to trigger the position sensor, the magnetic clamping seat and the electromagnet attract each other to compensate a barrier force for the whole mounting pipe, so that the problem of larger settlement of the soil is avoided.

3. A positioning plate is irradiated by infrared rays, points irradiated by the infrared rays are arranged on the positioning plate before and after deflection, the included angle of the positioning plate before and after deflection can be calculated by measuring the linear distance between the two points, and the radian value of curve jacking of the pipe jacking machine can be correspondingly known through the included angle, therefore, whether the jacking direction can achieve the established curve effect or not is judged, meanwhile, the angle value is compensated in cooperation with driving of the hydraulic cylinder, the curve jacking effect of the pipe jacking machine is improved, and the function of monitoring the curve jacking state of the pipe jacking machine in real time is achieved.

4. Through the arrangement of the laser induction assemblies, adaptation to long-distance jacking can be realized, and the problem that light rays of laser during long-distance pipe jacking are weaker and weaker can be effectively solved, so that the adjusting step of the deviation rectifying oil cylinders caused by improper laser guiding can be avoided, and the normal jacking and implementation efficiency of the curved jacking pipe can be guaranteed and improved.

BRIEF DESCRIPTION OF THE DRAWINGS

The accompanying drawings are used to provide a further understanding of the present disclosure and constitute part of the description, which are used to interpret the present disclosure together with embodiments of the present disclosure, and do not constitute limitations on the present disclosure. In the drawings.

in the figures, 1, pipe jacking machine; 3, curved jacking pipe; 4, jacking pipe; 6, arcing assembly; 7, soil settlement monitoring assembly; 11, mud water bin; 12, cutterhead; 13, crushing cutter; 14, rotating shaft; 15, slurry guide pipe; 16, slurry injection pipe; 17, center drilling tool; 18, partition plate; 19, motor; 20, stirring rod; 21, mud scraping plate; 22, spiral conveyor; 23, mud discharging vehicle; 24, mud discharging pipe; 25, lubricating pipe; 26, deviation rectifying oil cylinder; 27, first-state positioning plate; 28, second-state positioning plate; 29, adjusting bin; 31, annular liner plate; 32, safety rod; 41, laser emitter; 42, guider; 43, laser inductor; 44, groove; 45, mounting table; 46, three-dimensional attitude adjusting instrument; 47, wiring channel; 51, control console; 52, main jacking hydraulic oil cylinder; 61, hydraulic cylinder; 62, mounting base; 63, ball head groove; 64, telescopic rod; 70, spring; 71, mounting pipe; 72, settlement pipe; 73, settlement ring; 74, protective cover; 75, position sensor; 76, buckling cover; 77, extension part; 78, magnetic clamping seat; 79, lifting rod.

DETAILED DESCRIPTION OF THE EMBODIMENTS

The technical solution in the embodiments of the present disclosure will be clearly and completely described below in combination with the attached drawings in the embodiments of the present disclosure. Obviously, the described embodiments are only part of the embodiments of the present disclosure, not all of the embodiments. Based on the embodiments of the present disclosure, all other embodiments obtained by those of ordinary skill in the art without creative work belong to the protection scope of the present disclosure.

Figure 1:
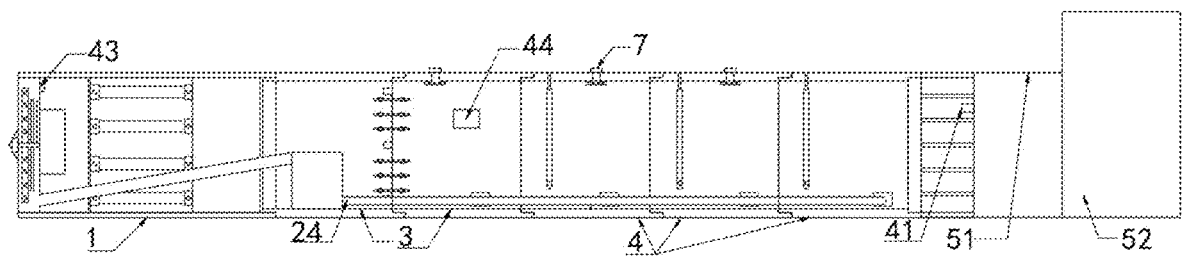
FIG. 1 is an integral structural schematic diagram of the present disclosure.
Figure 2:
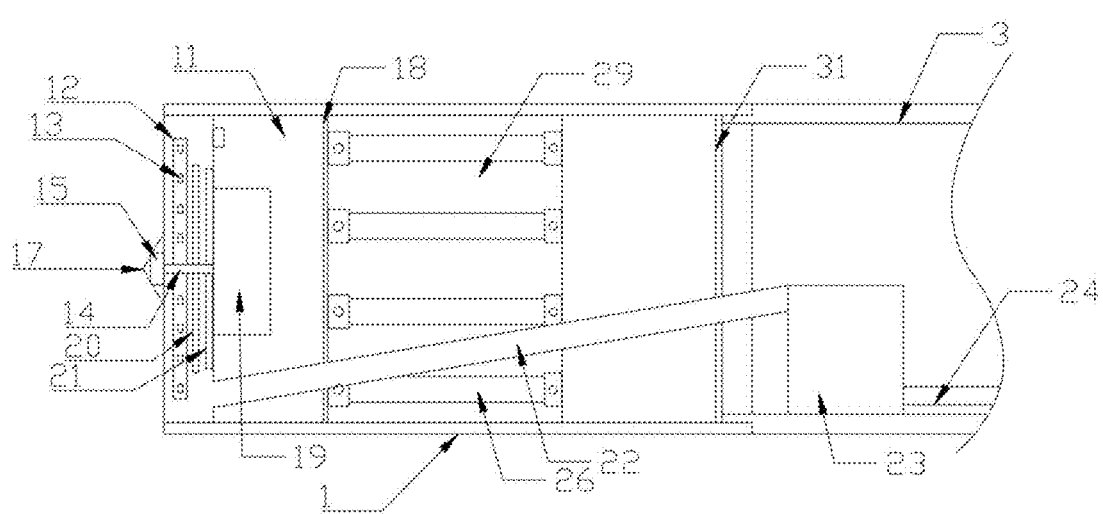
FIG. 2 is a schematic diagram of an internal structure of a pipe jacking machine of the present disclosure.
Figure 3:
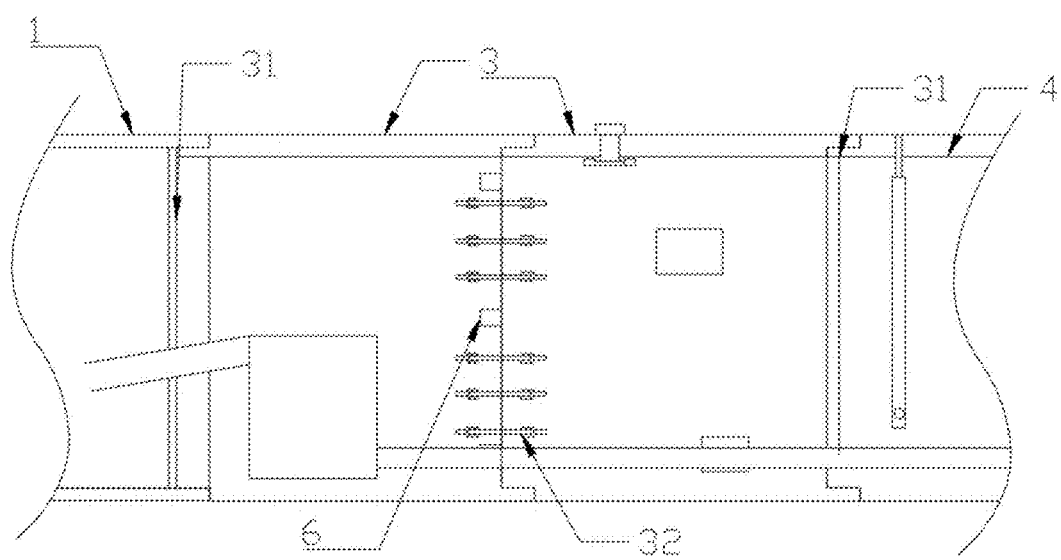
FIG. 3 is a schematic diagram of an internal structure of a curved jacking pipe of the present disclosure.
Figure 4:
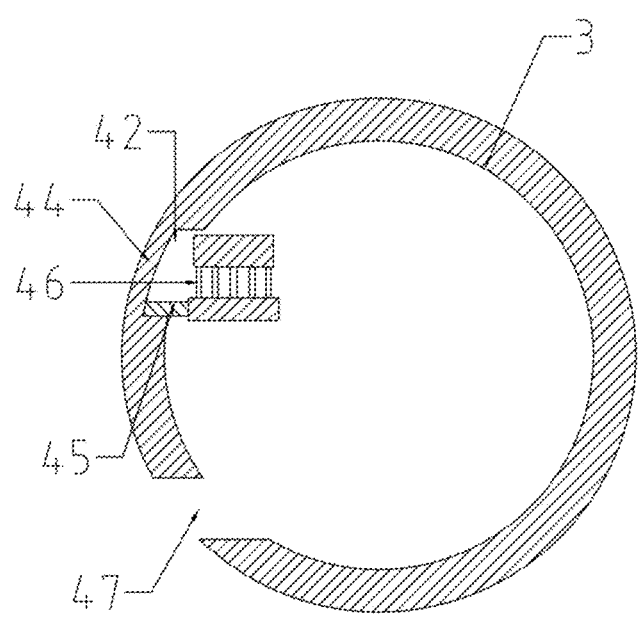
FIG. 4 is a cross-sectional structure schematic diagram of a guider in a curved jacking pipe of the present disclosure.
Figure 5:
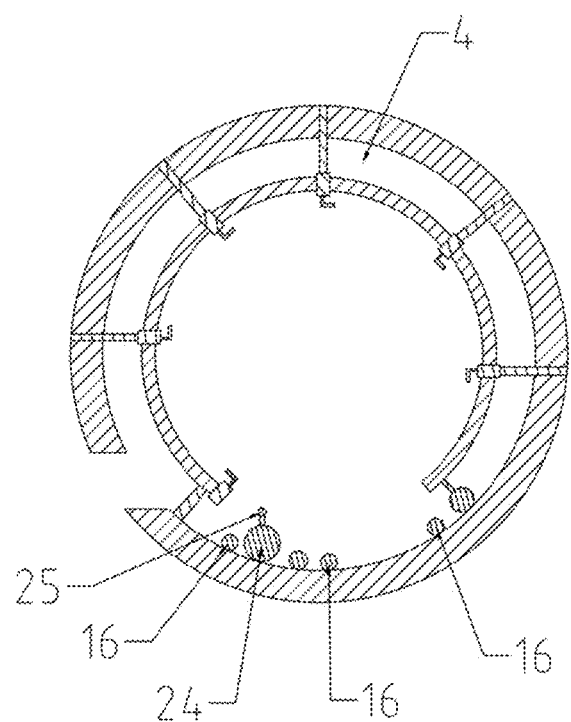
FIG. 5 is a cross-sectional structure schematic diagram of a jacking pipe of the present disclosure.
Figure 6:
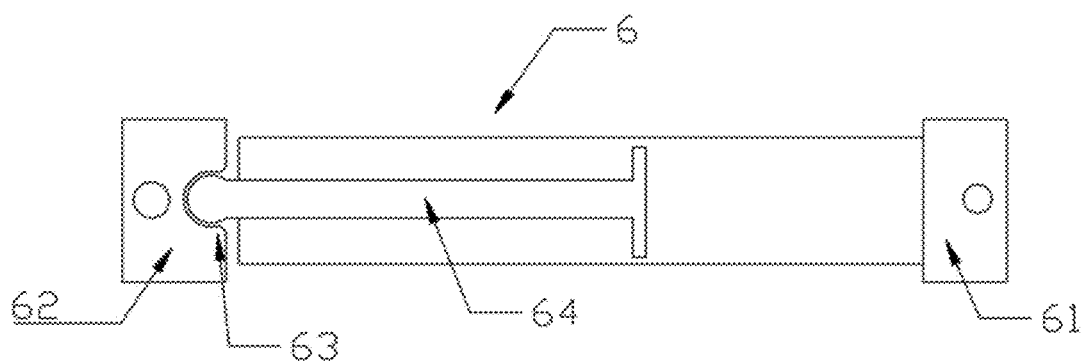
FIG. 6 is a structural schematic diagram of an arcing assembly of the present disclosure.
Figure 7:
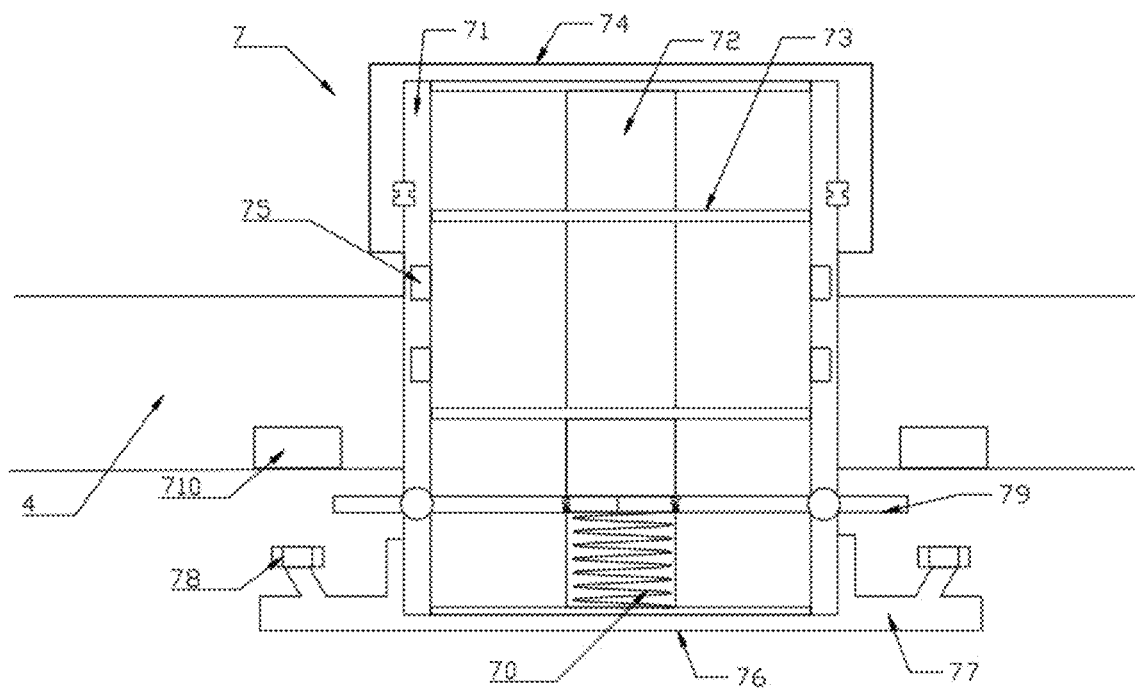
FIG. 7 is a structural schematic diagram of a soil settlement monitoring assembly of the present disclosure.

Embodiment: please refer to FIGS. 1-1, the technical solution provided by the present disclosure is that a real-time intelligent monitoring system for long-distance curved pipe jacking includes a pipe jacking mechanism and a working platform, the working platform includes a control console 51 and a main jacking hydraulic oil cylinder 52, the control console is arranged at one side of the main jacking hydraulic oil cylinder 52, the control console 51 is electrically connected with the main jacking hydraulic oil cylinder 52, the pipe jacking mechanism includes a pipe jacking machine 1, a curved jacking pipe 3 and a jacking pipe 4, the pipe jacking machine 1, the curved jacking pipe 3 and the jacking pipe 4 are sequentially arranged and movably connected, the main jacking hydraulic oil cylinder 52 corresponds to the end face of the jacking pipe 4, a mud discharging assembly and a deviation rectifying assembly are arranged inside the pipe jacking machine 1, an arcing assembly 6 is arranged inside the curved jacking pipe 3, a soil settlement monitoring assembly 7 is arranged at the top of the jacking pipe 4, and laser induction assemblies are arranged inside the pipe jacking machine 1, the curved jacking pipe 3 and the jacking pipe 4.

The main jacking hydraulic oil cylinder 52 is used for driving the jacking pipe 4, a plurality of jacking pipes 4 are arranged, jacking of the whole pipe jacking mechanism is achieved by increasing the number of the jacking pipes 4 and enabling the main jacking hydraulic oil cylinder 52 to drive the last jacking pipe 4, the pipe jacking machine 1 jacks the foremost end, when the pipe jacking machine 1 conducts jacking, mud in soil is jacked and loosened, the mud discharging assembly is used for transferring mud at the front end of the pipe jacking machine 1 to the ground, the deviation rectifying assembly is used for achieving deflection of the pipe jacking machine 1, the arcing assembly 6 is used together with the pipe jacking machine 1 to act for achieving the curved trend of the curved jacking pipe while the pipe jacking machine 1 deflects, the soil settlement monitoring assembly 7 is used for preventing rapid settlement of soil and meanwhile can provide supporting force for the surrounding area of the settlement position of the soil so as to reduce the probability that the joint of the jacking pipe 4 and a mounting pipe 71 is bent due to being severely stressed, the use quality of the jacking pipe 4 is guaranteed, the laser induction assembly is used for monitoring the jacking state of the system in real time, the problem that it is difficult to achieve the established curved jacking radian in the past can be effectively solved when the curved jacking pipe conducts jacking, the curved jacking effect can be favorably improved, meanwhile, the settlement condition of the soil can be monitored in real time, excessive settlement of the soil can be slowed down in time, and therefore normal advancing of jacking of the jacking pipe is guaranteed.

One end of the curved jacking pipe 3 is connected with the pipe jacking machine 1 through an annular liner plate 31, the other end of the curved jacking pipe 3 is also connected with the jacking pipe 4 through an annular liner plate 31, at least two curved jacking pipes 3 are arranged, two curved jacking pipes 3 are movably connected through a plurality of safety rods 32, the arcing assembly 6 includes a hydraulic cylinder 61, a mounting base 62 and a telescopic rod 64, the hydraulic cylinder 61 and the mounting base 62 are arranged on the corresponding end faces of two adjacent curved jacking pipes 3 respectively, a ball, head groove 63 is arranged at one side of the mounting base 62, the hydraulic cylinder 61 is fixedly connected with one end of the telescopic rod 64, the other end of the telescopic rod 64 is in a ball head shape, and the ball head-shaped end of the telescopic rod 64 is slidably arranged on the inner wall of the ball head groove 63.

The annular liner plate 3 is used for enhancing the connection strength between the curved jacking pipes 3, so that no gap is generated between the curved jacking pipes when the curved jacking pipes 3 move in a curved route, the safety rod 32 is used for ensuring that the problem of disjunction caused by overlarge gaps among the plurality of curved jacking pipes 3 under the driving of the arcing assembly 6 does not occur, so that the movement range of the curved jacking pipes 3 does not exceed the protection length of the safety rods 32; the hydraulic cylinder 61 is used for driving the telescopic rod 64, the curved jacking pipe 3 where the ball head groove 63 is located can rotate around the ball head end of the telescopic rod 64, when the pipe jacking machine 1 conducts curve steering, the curved jacking pipe 3 also deflects, at the moment, the hydraulic cylinder 61 extends and retracts to control the curve radian of the previous curved jacking pipe 3, and therefore the deflection angle of the curved jacking pipe 3 can be flexibly adjusted through the arrangement of the ball head telescopic rod 64, for example, when the linear driving force of the hydraulic cylinder 61 is relatively large, the previous curved jacking pipe 3 is stressed and deflects by a relatively large angle under the action of the ball head groove 63, and otherwise, when the linear driving force of the hydraulic cylinder 61 is relatively small, the previous curved jacking pipe 3 deflects by a relatively small angle, namely, different deflection angles of the curved jacking pipe 3 can be achieved through different driving forces of the hydraulic cylinder 61 and the ball head groove 63, and meanwhile jacking of different curve radians can be formed under the driving of the main jacking hydraulic oil cylinder 52, therefore, the whole jacking pipe can achieve a more ideal curved jacking effect.

The soil settlement monitoring assembly 7 includes a mounting pipe 71, a settlement pipe 72, a settlement ring 73 and a protective cover 74, the mounting pipe 71 penetrates through the pipe wall of the jacking pipe 4, the bottom end of the mounting pipe 71 is arranged inside the jacking pipe 4, the protective cover 74 is arranged at the top end of the mounting pipe 71, a wear-resistant layer is arranged on the outer side of the protective cover 74, the settlement ring 73 is slidably arranged on the inner wall of the mounting pipe 71, the settlement pipe 72 is fixedly arranged inside the settlement ring 73, a position sensor 75 is arranged on the inner wall of the mounting pipe 71, the top end of the settlement pipe 72 is in contact connection with the protective cover 74 through a supporting plate, a buckling cover 76 is horizontally arranged at the bottom end of the settlement pipe 72, extension parts 77 are arranged at the two ends of the buckling cover 76, a magnetic clamping seat 78 is arranged on the extension part 77, an electromagnet 710 corresponding to the magnetic clamping seat 78 in position is arranged inside the jacking pipe 4, the magnetic clamping seat 78 and the electromagnet 710 are arranged in a magnetic attraction mode, and a middle part of the protective cover 74 and a middle part of the buckling cover 76 are both elastic.

The protective cover is mounted at the top end of the mounting pipe 71 through a rubber ring, a prefabricated hole can be formed in the jacking pipe 4 in advance, the wear-resistant layer is used for preventing excessive friction generated in the jacking process, the protective cover 74 is used as a settled soil stressed area, the descending amount of the settlement pipe 72 and the settlement ring 73 corresponds to the settlement condition of the soil, when the settlement ring 73 descends to the position of the position sensor 75, at the moment, the electromagnets are started, so that the magnetic clamping seats 78 and the electromagnets attract each other to provide an attraction force for the settlement pipe 72, and the settlement of the soil can be slowed down.

A plurality of lifting rods 79 are arranged at the bottom of the settlement pipe 72, the plurality of lifting rods 79 all extend out of the mounting pipe 71, the positions where the lifting rod 79 penetrates through the mounting pipe 71 are hinged, the bottom of the lifting rod 79 is fixedly connected with the top of a spring 70 through a fixing plate, and the spring 70 is fixedly connected with the inner bottom of the mounting pipe 71; when the position of the protective cover 74 is lowered, the spring 70 is squeezed, the settlement speed of the soil can be reduced, the settlement pipe is pressed downwards to squeeze one end of the lifting rod 79, so that the other end of the lifting rod 79 is lifted, and a supporting force can be provided for the pipe wall of the jacking pipe 4; and the area, located around the protective cover 74, outside the jacking pipe 4 also has a settlement trend, and the probability that the jacking pipe 4 is insufficient in stress, and consequently the joint of the jacking pipe 4 and the mounting pipe 71 is bent can be effectively reduced through the spring 70 and the lifting rod 79.

The pipe jacking machine 1 includes a mud water bin 11 and an adjusting bin 29, the mud water bin 11 is movably connected with the end face of the adjusting bin 29, the mud water bin 11 is connected with the curved jacking pipe 3 through the adjusting bin 29, a cutterhead 12 is arranged at the front end of the mud water bin 11, a plurality of crushing cutters 13 are arranged on the peripheral wall of the cutterhead 12, the cutterhead 12 sleeves a rotating shaft 14, a plurality of slurry guide pipes 15 are arranged on the outer side of the cutterhead 12 and communicate with one end of a slurry injection pipe 16, a center drilling tool 17 is arranged at one ends of the slurry guide pipes 15, a partition plate 18 is arranged inside the mud water bin 11, a motor 19 is arranged at one side of the partition plate 18, an output shaft of the motor 19 is fixedly connected with the rotating shaft 14, the rotating shaft 14 is further sleeved with a stirring rod 20, a mud scraping plate 21 is arranged on the side, away from the partition plate 18, of the motor 19, the mud discharging assembly includes a spiral conveyor 22 which is arranged inside the adjusting bin 29, one end of the spiral conveyor 22 communicates with the mud water bin 11 through the partition plate 18, the other end of the spiral conveyor 22 is provided with a mud discharging vehicle 23, one side of the mud discharging vehicle 23 is provided with a mud discharging pump, the mud discharging pump is connected with the ground through a mud discharging pipe 24, and one side of the mud discharging pipe 24 is connected with a lubricating pipe 25 through a pipeline.

The cutterhead 12 is used for loosening soil at the front end when the pipe jacking machine 1 jacks forwards to guarantee normal advancing of jacking, the crushing cutter 13 is used for crushing hard objects in the soil, the slurry guide pipe 15 is used for injecting slurry into the front end of the pipe jacking machine 1 through the slurry injection pipe 16 to prevent deep sinking of the soil above an excavation face, the stirring rod 20 is used for stirring soil entering the mud water bin due to the jacking and mud injected into the front end, and is used for preventing the problem that the soil is difficult to discharge due to excessive friction, the mud scraping plate 21 is used for preventing the soil from being accumulated in the mud water bin 11, and the spiral conveyor 22 is used for conveying a mixture of the soil and the mud to the mud discharging vehicle 23 and transferring the mud and the soil to the ground through the mud discharging pump.

The deviation rectifying assembly includes a plurality of deviation rectifying oil cylinders 26 that are arranged on the inner side of the peripheral wall of the adjusting bin 29 at equal intervals, and the deviation rectifying oil cylinders 26 extend and retract to adjust the jacking direction of the pipe jacking machine 1, this embodiment considers curve deflection advancing in the horizontal direction, and if upward or downward deflection advancing is needed, a vertical oil cylinder can be arranged for cooperation to adjust the height.

The laser induction assembly includes a laser emitter 41, a guider 42 and a laser inductor 43, the laser emitter 41 is arranged at one side of the main jacking hydraulic oil cylinder 52, a groove 44 is formed on the inner side wall of the curved jacking pipe 3, a mounting table 45 is arranged inside the groove 44, a three-dimensional attitude adjusting instrument 46 is arranged on the mounting table 45, the guider 42 is arranged at the top of the three-dimensional attitude adjusting instrument 46, and the laser inductor 43 is arranged inside the pipe jacking machine 1; the guider 42 is an automatic guider, a plurality of guiders 42 are arranged according to the number of the jacking pipes, the three-dimensional attitude adjusting instrument 46 is used for adjusting the transmission direction of the guiders 42 so that the laser inductor 43 can receive laser emitted by the laser emitter 41 in real time, the guiders 42 are used for checking the deviation state of the pipe jacking machine 1, guide the direction for jacking, and continuously display real-time position and attitude of the whole jacking pipe to an operator, and the operator controls curve jacking through the hydraulic cylinder 61 by means of guiding data and calculation data of an analysis unit.

The plurality of jacking pipes 4 are arranged, the adjacent jacking pipes 4 are hermetically connected, and a wiring channel 47 is formed in the bottom of each jacking pipe 4; a sealing ring is jacked into a pipe sleeve ring at the tail end of the jacking pipe 4 by the main jacking hydraulic oil cylinder 52.

A positioning plate is arranged on the inner wall of the mud water bin 11, an acquisition unit and the analysis unit are further arranged inside the mud water bin 11, the acquisition unit is electrically connected with the analysis unit, the acquisition unit is used for acquiring the linear distance before and after deflection of the positioning plate and sending the acquired linear distance data to the analysis unit, and the analysis unit is used for calculating the angle before and after deflection of the positioning plate.

The acquisition unit is an infrared sensor, the analysis unit is a Programmable Logic Controller (PLC), the hydraulic cylinder 61 is electrically connected with the PLC, the positioning plate includes a first-state positioning plate 27 and a second-state positioning plate 28, the second-state positioning plate 28 is in a state after the first-state positioning plate 27 deflects around a fixed point, an infrared signal is perpendicular to a plane where the first-state positioning plate 27 is located, and does not coincide with the central axis of the positioning plate, the fixed point is set as a point R, the point of intersection of the infrared signal and the first-state positioning plate 27 is set as a point A, the point of intersection of the infrared signal and the second-state positioning plate 28 is set as a point B, the position of the infrared sensor is set as a point C, and the deflection angle θ between the first-state positioning plate 27 and the second-state positioning plate 28 is calculated according to the following formula:

$$h = L - L';$$

$$\tan\theta = \frac{h}{x};$$

$$\theta = \arctan\frac{h}{x};$$

wherein x is the perpendicular distance between the infrared signal and the point R, L is the distance between A and C, L' is the distance between B and C, and h is the distance between A and B.

Figure 8:
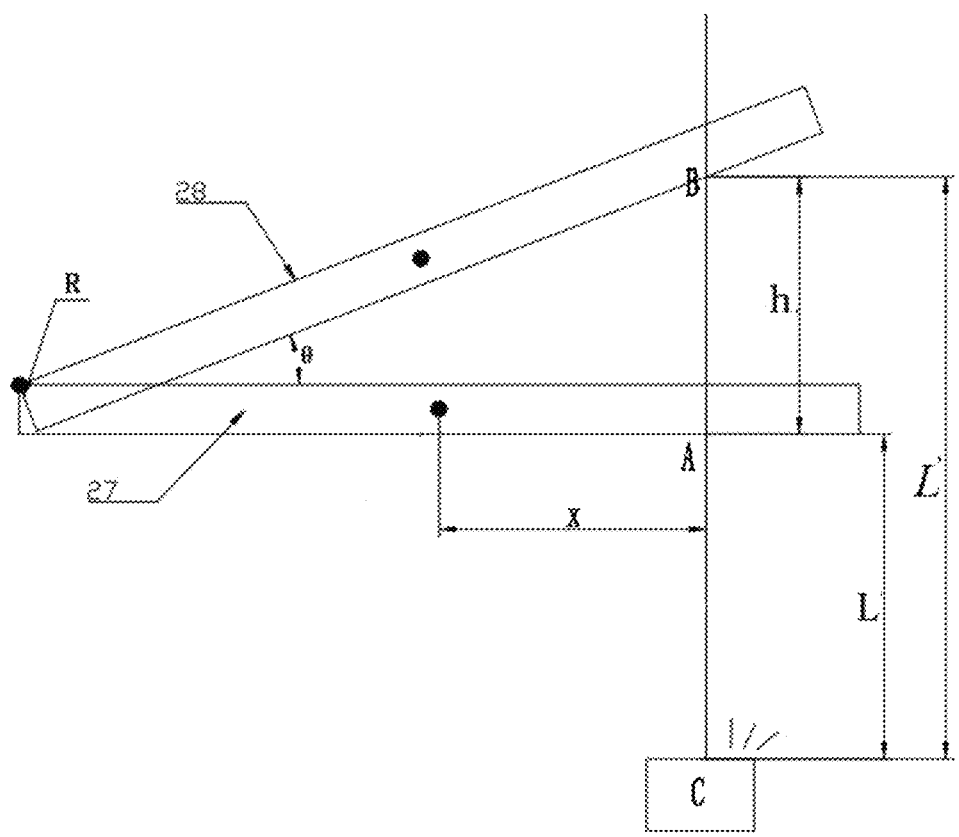
FIG. 8 is a first structural schematic diagram of deflection of a positioning plate of the present disclosure.
Figure 9:
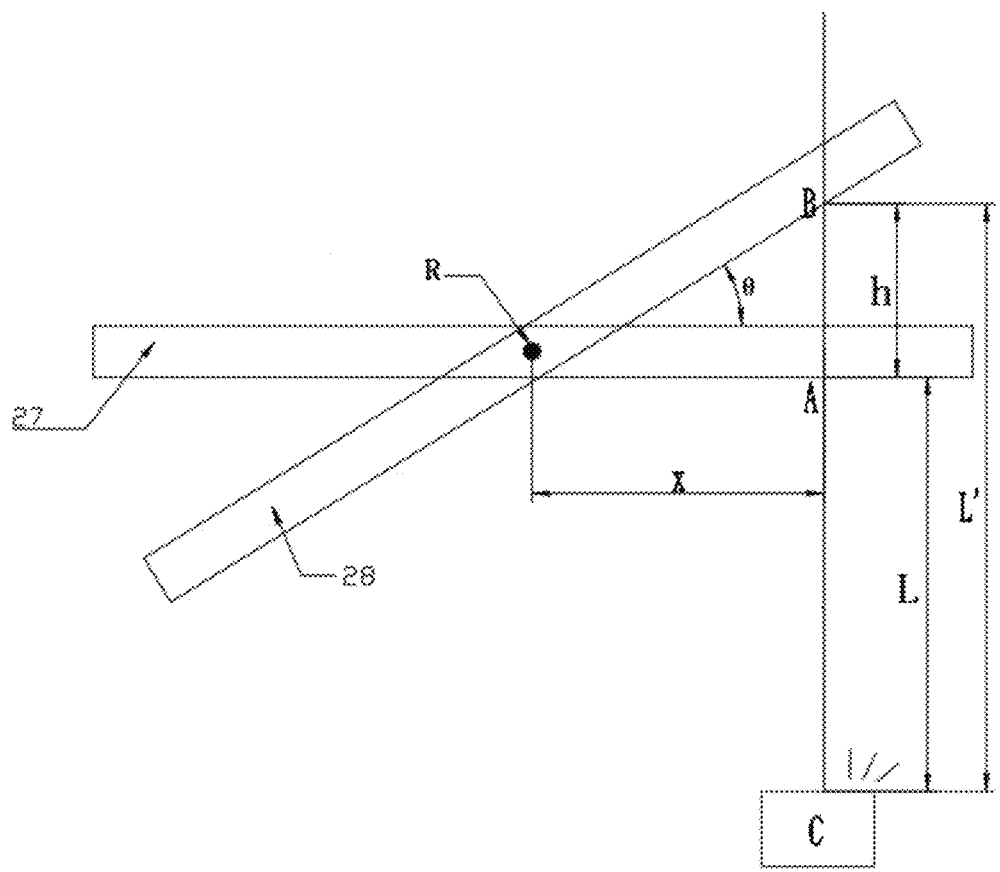
FIG. 9 is a second structural schematic diagram of deflection of the positioning plate of the present disclosure.
Figure 10:
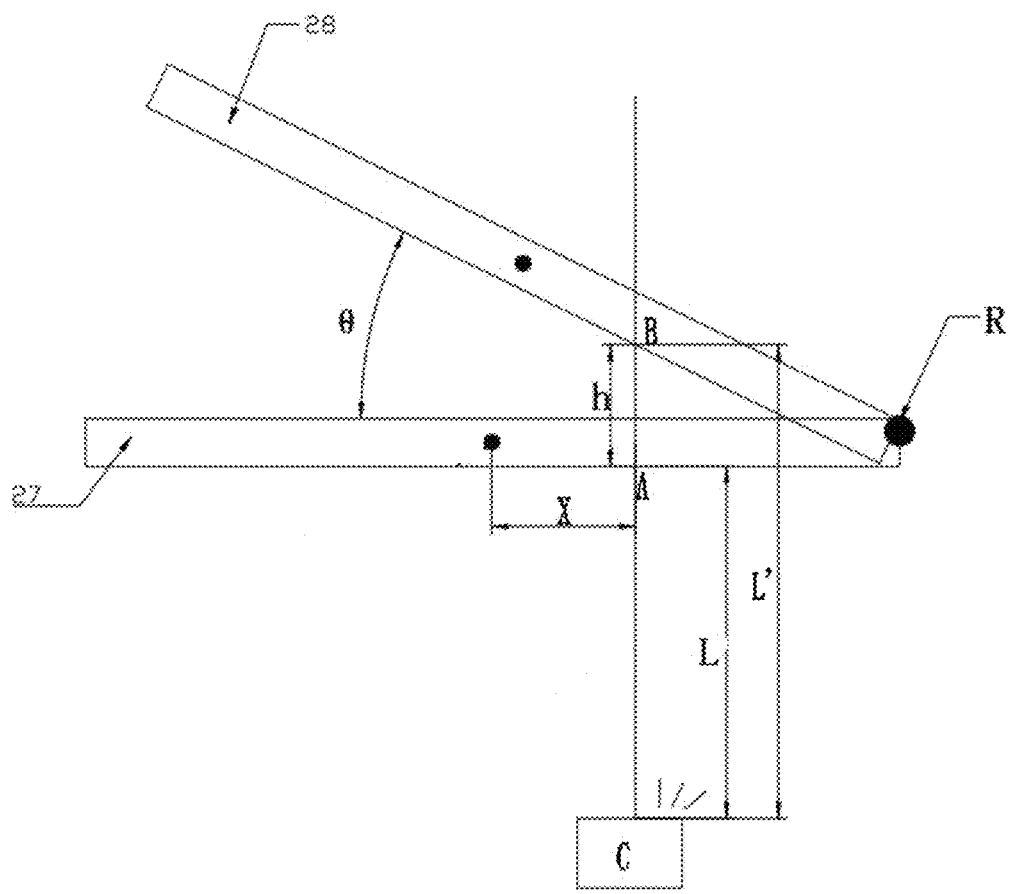
FIG. 10 is a third structural schematic diagram of deflection of the positioning plate of the present disclosure.
Figure 11:
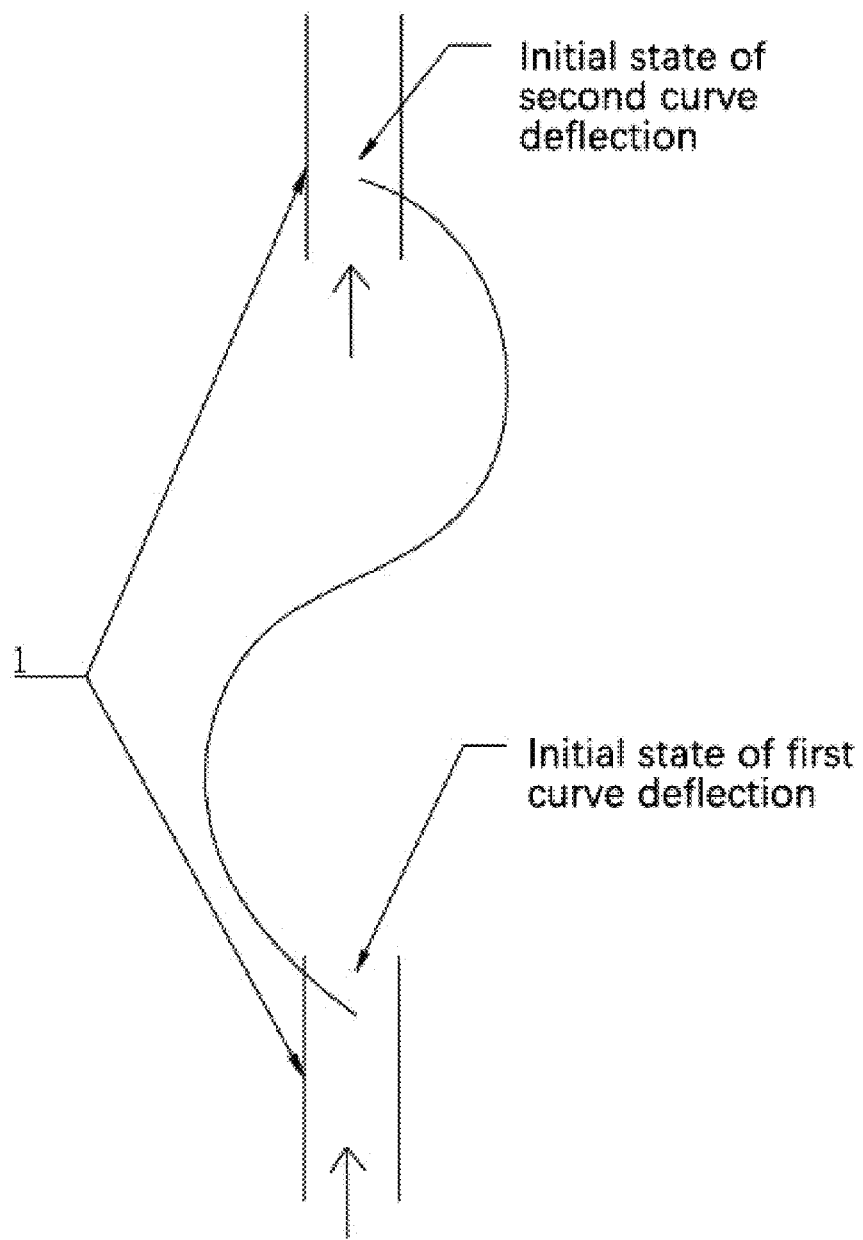
FIG. 11 is a structural schematic diagram of angle calculation during multiple times of curved jacking of a pipe jacking machine of the present disclosure.

Irradiated points A and B are correspondingly fainted on the positioning plates in two states through irradiation of the infrared signal, the infrared signal does not coincide with the central axis of the positioning plate due to the fact that if the positioning plate deflects around the axis, points of intersection of the positioning plate and the infrared signal before and after deflection coincide, and at the moment, the angle cannot be calculated. The positioning plate may deflect around different points when deflecting along with the pipe jacking machine, such as the positions of three different fixed points in FIGS. 8-10, the length of the positioning plate is set to Y, the length from the center point to the end point of the positioning plate is Y/2, at the moment, $$\theta = \arctan\frac{h}{x + \frac{y}{2}},$$

and in FIG. 9, the positioning plate deflects around the axis, at the moment, $$\theta = \arctan\frac{h}{x},$$

in FIG. 10, $$\theta = \arctan\frac{h}{\frac{Y}{2} - X},$$

by calculating the deflection angle of the positioning plate, different curve radians of deflection advancing of the pipe jacking machine can be correspondingly obtained according to the deflection angle, the curved jacking effect of the jacking pipe can be better and closer to the established ideal curved jacking effect, if the curve radian is too wide due to too large angle, the radian value of the curve can be reduced through retraction of the hydraulic cylinder, and if the jacking effect is poor caused by too narrow curve radian due to too small angle, the hydraulic cylinder can extend to further assist in driving the curved jacking pipe to apply thrust to the pipe jacking machine, so that the curve radian of the pipe jacking machine is gradually increased; therefore, the effect that the acquisition unit and the analysis unit cooperate with the driving of the hydraulic cylinder to compensate the deflection angle value of the pipe jacking machine is achieved, the curved jacking effect of the pipe jacking machine is favorably improved, and in the figures, the initial end of each curve radian is the to moment when the infrared signal starts to detect, the analysis unit completes data calculation once every time the pipe jacking machine completes one curve deflection, and the analysis unit calculates the deflection angle value again when the next curve deflection occurs.

The working principle of the present disclosure is that: the pipe jacking machine 1 communicates with a ventilation pipeline, a power cable, a control cable and an illumination cable, the power cable is used for providing power for the motor, the control cable is used for controlling the guider 42, the illumination cable is used for providing illumination for the curved jacking pipe 3 and the jacking pipe 4, thus facilitating personnel to enter the jacking pipe for overhauling; a plurality of jacking pipes 4 are arranged, when each jacking pipe 4 is mounted, a ventilation pipeline, a power cable, a control cable, a mud discharging pump and a mud discharging pipe 24 are mounted through a wiring channel 47, the jacking pipes are driven by the main jacking hydraulic oil cylinder 52 so that the pipe jacking machine 1 can conduct forward jacking, curve jacking of the whole jacking pipe is achieved through the fact that the deviation rectifying oil cylinder 26 cooperates with the hydraulic cylinder 61 and the ball head groove 63 at the same time, and in the jacking process, soil is conveyed to the ground by the spiral conveyor 22 to guarantee normal jacking of the jacking pipe and prevent soil heave at the front end of the pipe jacking machine 1, soil settlement at the front end of the pipe jacking machine 1 can be prevented by injecting slurry through the slurry (amide pipe 15, the soil settlement is slowed down through the soil settlement monitoring assembly 7, laser is emitted by the laser emitter 41, and guided by the guider 42, and finally the jacking state of the whole jacking pipe is monitored in real time by the laser inductor 43.

It needs to be illustrated that, herein, relationship terms, such as first and second, etc., are only used to distinguish one entity or operation from another entity or operation without necessarily requiring or suggesting the presence of any such actual relationship or order between the entities or operations. Moreover, the term "including", "included", or any other variant thereof is intended to encompass non-exclusive inclusion, such that a process, method, article, or device including a series of elements includes not only those elements but also other elements that are not explicitly listed, or also elements inherent to such a process, method, article, or device.

Finally, it should be explained that the above embodiments are only the preferred embodiments of the present disclosure and are not used for limiting the present disclosure, although the present disclosure has been explained in detail by reference to the embodiments, those skilled in the art can still modify the technical solutions recorded in the embodiments, or equivalently replace a part of technical features. In the spirit and principle of the present to disclosure, any modifications, equivalent replacements, improvements and the like should be included in the protection scope of the present disclosure.

It needs to be illustrated that, herein, relationship terms, such as first and second, etc., are only used to distinguish one entity or operation from another entity or operation without necessarily requiring or suggesting the presence of any such actual relationship or order between the entities or operations. Moreover, the term "including", "included", or any other variant thereof is intended to encompass non-exclusive inclusion, such that a process, method, article, or device including a series of elements includes not only those elements but also other elements that are not explicitly listed, or also elements inherent to such a process, method, article, or device.

Finally, it should be explained that the above embodiments are only the preferred embodiments of the present disclosure and are not used for limiting the present disclosure, although the present disclosure has been explained in detail by reference to the embodiments, those skilled in the art can still modify the technical solutions recorded in the embodiments, or equivalently replace a part of technical features. In the spirit and principle of the present to disclosure, any modifications, equivalent replacements, improvements and the like should be included in the protection scope of the present disclosure.

What is claimed is:

1. A real-time intelligent monitoring system for curved pipe jacking, comprising a pipe jacking mechanism and a working platform, wherein the working platform comprises a control console (51) and a main jacking hydraulic oil cylinder (52), the control console (51) is arranged at one side of the main jacking hydraulic oil cylinder (52) and is electrically connected with the main jacking hydraulic oil cylinder (52), the pipe jacking mechanism comprises a pipe jacking machine (1), at least two curved jacking pipes (3) and a plurality of jacking pipes (4), the pipe jacking machine (1), the at least two curved jacking pipe (3) and the plurality of jacking pipes (4) are sequentially arranged and movably connected, the main jacking hydraulic oil cylinder (52) corresponds to an end face of the plurality of jacking pipes (4), a mud discharging assembly and a deviation rectifying assembly are arranged inside the pipe jacking machine (1), an arcing assembly (6) is arranged inside the at least two curved jacking pipes (3), a soil settlement monitoring assembly (7) is arranged on a top of the plurality of jacking pipes (4), and laser induction assemblies are arranged inside the pipe jacking machine (1), the at least two curved jacking pipes (3) and the plurality of jacking pipes (4);

the soil settlement monitoring assembly (7) comprises a mounting pipe (71), a settlement pipe (72), a settlement ring (73) and a protective cover (74), the mounting pipe (71) penetrates through a pipe wall of the jacking pipe (4), a bottom end of the mounting pipe (71) is arranged inside the jacking pipe (4), the protective cover (74) is arranged at a top end of the mounting pipe (71), a wear-resistant layer is arranged on an outer side of the protective cover (74), the settlement ring (73) is slidably arranged on an inner wall of the mounting pipe (71), the settlement pipe (72) is fixedly arranged inside the settlement ring (73), a position sensor (75) is arranged on the inner wall of the mounting pipe (71), a top end of the settlement pipe (72) is in contact connection with the protective cover (74) through a supporting plate, a buckling cover (76) is horizontally arranged at a bottom end of the settlement pipe (72), extension parts (77) are arranged at two ends of the buckling cover (76), a magnetic clamping seat (78) is arranged on each extension part (77), an electromagnet corresponding to the magnetic clamping seat (78) in position is arranged inside the jacking pipe (4), the magnetic clamping seat (78) and the electromagnet are arranged in a magnetic attraction mode, and a middle of the protective cover (74) and a middle of the buckling cover (76) are both elastic; and the laser induction assembly comprises a laser emitter (41), a guider (42) and a laser inductor (43), the laser emitter (41) is arranged at one side of the main jacking hydraulic oil cylinder (52), a groove (44) is formed on an inner side wall of the curved jacking pipe (3), a mounting table (45) is arranged inside the groove (44), a three-dimensional attitude adjusting instrument (46) is arranged on the mounting table (45), the guider (42) is arranged at a top of the three-dimensional attitude adjusting instrument (46), and the laser inductor (43) is arranged inside the pipe jacking machine (1).

2. The real-time intelligent monitoring system for curved pipe jacking according to claim 1, wherein one end of the at least two curved jacking pipes (3) is connected with the pipe jacking machine (1) through a first annular liner plate (31), another end of the at least two curved jacking pipes (3) is connected with the plurality of jacking pipes (4) through a second annular liner plate (31), each of two adjacent curved jacking pipes (3) are movably connected through a plurality of safety rods (32), the arcing assembly (6) comprises a hydraulic cylinder (61), a mounting base (62) and a telescopic rod (64), the hydraulic cylinder (61) and the mounting base (62) are arranged on the two adjacent curved jacking pipes (3) of the at least two curved jacking pipes (3) respectively, a ball head groove (63) is formed on one side of the mounting base (62), the hydraulic cylinder (61) is fixedly connected with one end of the telescopic rod (64), the other end of the telescopic rod (64) is in a ball head shape, and the ball head-shaped end of the telescopic rod (64) is slidably arranged on an inner wall of the ball head groove (63).

3. The real-time intelligent monitoring system for curved pipe jacking according to claim 2, wherein a plurality of lifting rods (79) are arranged at a bottom of the settlement pipe (72) and extend out of the mounting pipe (71), each lifting rod (79) is hinged to the mounting pipe (71), a bottom of the lifting rods (79) is fixedly connected with a top of a spring (70) through a fixing plate, and the spring (70) is fixedly connected with an inner bottom of the mounting pipe (71).

4. The real-time intelligent monitoring system for curved pipe jacking according to claim 3, wherein the pipe jacking machine (1) comprises a mud water bin (11) and an adjusting bin (29), the mud water bin (11) is movably connected with an end face of the adjusting bin (29), the mud water bin (11) is connected with the at least two curved jacking pipes (3) through the adjusting bin (29), a cutterhead (12) is arranged at a front end of the mud water bin (11), a plurality of crushing cutters (13) are arranged on a peripheral wall of the cutterhead (12), the cutterhead (12) sleeves a rotating shaft (14), a plurality of slurry guide pipes (15) are arranged on an outer side of the cutterhead (12) and communicate with one end of a slurry injection pipe (16), a center drilling tool (17) is arranged at one end of the slurry guide pipes (15), a partition plate (18) is arranged inside the mud water bin (11), a motor (19) is arranged at one side of the partition plate (18), an output shaft of the motor (19) is fixedly connected with the rotating shaft (14), the rotating shaft (14) is further sleeved with a stirring rod (20), a side, away from the partition plate (18), of the motor (19) is provided with a mud scraping plate (21), the mud discharging assembly comprises a spiral conveyor (22), the spiral conveyor (22) is arranged inside the adjusting bin (29), one end of the spiral conveyor (22) communicates with the mud water bin (11) through the partition plate (18), another end of the spiral conveyor (22) is provided with a mud discharging vehicle (23), one side of the mud discharging vehicle (23) is provided with a mud discharging pump, the mud discharging pump is connected to ground through a mud discharging pipe (24), and one side of the mud discharging pipe (24) is connected with a lubricating pipe (25) through a pipeline.

5. The real-time intelligent monitoring system for curved pipe jacking according to claim 4, wherein the deviation rectifying assembly comprises a plurality of deviation rectifying oil cylinders (26) that are arranged on an inner side of a peripheral wall of the adjusting bin (29) at equal intervals.

6. The real-time intelligent monitoring system for curved pipe jacking according to claim 5, wherein each of two adjacent jacking pipes (4) are hermetically connected, and a wiring channel (47) is formed in a bottom of each of the two adjacent jacking pipes (4).

7. The real-time intelligent monitoring system for curved pipe jacking according to claim 6, wherein a positioning plate is arranged on an inner wall of the mud water bin (11), an acquisition unit and an analysis unit are further arranged inside the mud water bin (11), the acquisition unit is electrically connected with the analysis unit, the acquisition unit is used for acquiring a linear distance before and after deflection of the positioning plate, and sending acquired linear distance to the analysis unit, and the analysis unit is used for calculating a deflection angle θ the positioning plate.

8. The real-time intelligent monitoring system for curved pipe jacking according to claim 7, wherein the acquisition unit is an infrared sensor, the analysis unit is a Programmable Logic Controller (PLC), the hydraulic cylinder (61) is electrically connected with the PLC, the positioning plate comprises a first-state positioning plate (27) and a second-state positioning plate (28), the second-state positioning plate (28) is in a state after the first-state positioning plate (27) deflects around a fixed point, an infrared signal is perpendicular to a plane where the first-state positioning plate (27) is located, and does not coincide with a central axis of the positioning plate, the fixed point is set as a point R, a point of intersection of the infrared signal and the first-state positioning plate (27) is set as a point A, a point of intersection of the infrared signal and the second-state positioning plate (28) is set as a point B, a position of the infrared sensor is set as a point C, and the deflection angle θ between the first-state positioning plate (27) and the second-state positioning plate (28) is calculated according to the following formula:

$$h=L-L'; \tan\theta=h/x, \theta=\arctan h/x;$$

wherein x is a perpendicular distance between the infrared signal and the point R, L' is a distance between A and C, L is a distance between B and C, and h is a distance between A and B.

* * * * *